United States Patent
Sun et al.

(10) Patent No.: US 10,624,083 B2
(45) Date of Patent: Apr. 14, 2020

(54) DATA PROCESSING METHOD AND BASE STATION

(71) Applicant: CHINA MOBILE COMMUNICATIONS GROUP CO., LTD., Beijing (CN)

(72) Inventors: Junshuai Sun, Beijing (CN); Xueyan Huang, Beijing (CN); Feng Chen, Beijing (CN); Jinri Huang, Beijing (CN); Chihlin I, Beijing (CN)

(73) Assignee: CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 15/781,159

(22) PCT Filed: Sep. 2, 2016

(86) PCT No.: PCT/CN2016/097938
§ 371 (c)(1),
(2) Date: Jun. 4, 2018

(87) PCT Pub. No.: WO2017/092456
PCT Pub. Date: Jun. 8, 2017

(65) Prior Publication Data
US 2018/0359743 A1 Dec. 13, 2018

(30) Foreign Application Priority Data
Dec. 4, 2015 (CN) .......................... 2015 1 0886432

(51) Int. Cl.
*H04W 72/04* (2009.01)
*G06F 9/48* (2006.01)
(Continued)

(52) U.S. Cl.
CPC ...... *H04W 72/0426* (2013.01); *G06F 9/4806* (2013.01); *G06F 9/4881* (2013.01);
(Continued)

(58) Field of Classification Search
CPC .......................... H04W 88/08; H04W 72/1215
See application file for complete search history.

(56) References Cited

U.S. PATENT DOCUMENTS

2007/0079169 A1* 4/2007 Gabarre ................ G06F 9/4881
714/4.1
2009/0163144 A1* 6/2009 Nakatsugawa ....... H04W 24/10
455/67.13
(Continued)

FOREIGN PATENT DOCUMENTS

| CN | 103391181 A | 11/2013 |
| CN | 104124999 A | 10/2014 |
| CN | 104469814 A | 3/2015 |
| WO | 2013024353 A1 | 2/2013 |

OTHER PUBLICATIONS

International Search Report in international application No. PCT/CN2016/097938, dated Nov. 29, 2016.
(Continued)

*Primary Examiner* — Chi H Pham
*Assistant Examiner* — Fahmida S Chowdhury
(74) *Attorney, Agent, or Firm* — Syncoda LLC; Feng Ma

(57) ABSTRACT

A base station includes: a processor; and one or more units stored on a memory and executable by the processor, the one or more units including an identification unit and more than two task processing units, tasks which can be processed by the more than two task processing units being divided according to a pre-set task cycle gradient so that the more than two task processing units can process tasks having cycles within different task cycle ranges, wherein the identification unit is arranged to obtain a task, identify the cycle
(Continued)

of the task, and send the task to a task processing unit corresponding to the cycle of the task for processing; and the task processing unit is arranged to obtain and process the task sent by the identification unit. A corresponding data processing method is also provided.

10 Claims, 5 Drawing Sheets

(51) Int. Cl.
    *H04W 28/16*    (2009.01)
    *H04W 72/12*    (2009.01)
    *H04W 88/08*    (2009.01)
    *H04W 80/02*    (2009.01)

(52) U.S. Cl.
    CPC ....... *H04W 28/16* (2013.01); *H04W 72/1215* (2013.01); *H04W 88/08* (2013.01); *H04W 80/02* (2013.01)

(56) References Cited

U.S. PATENT DOCUMENTS

| | | |
|---|---|---|
| 2013/0058233 A1 | 3/2013 | Kim |
| 2014/0044259 A1* | 2/2014 | Funayama ............ G06F 21/602 380/243 |
| 2014/0211684 A1 | 7/2014 | Liu |
| 2014/0365430 A1* | 12/2014 | Funayama ............. G06F 16/16 707/609 |
| 2015/0078192 A1 | 3/2015 | Kim |
| 2015/0079911 A1 | 3/2015 | Kim |
| 2015/0146556 A1 | 5/2015 | Zheng et al. |
| 2015/0327096 A1 | 11/2015 | Kim |
| 2016/0021558 A1 | 1/2016 | Kim |
| 2016/0308741 A1* | 10/2016 | Xiang .................. H04W 28/16 |

OTHER PUBLICATIONS

English Translation of the Written Opinion of the International Search Authority in international application No. PCT/CN2016/097938, dated Nov. 29, 2016.

* cited by examiner

DATA PROCESSING METHOD AND BASE STATION

CROSS-REFERENCE TO RELATED APPLICATION

The present application claims benefit of Chinese Application No. 201510886432.1, filed on Dec. 4, 2015, the contents of which are hereby incorporated by reference in its entirety.

TECHNICAL FIELD

The present disclosure relates to wireless communication techniques, and in particular to a data processing method and a base station.

BACKGROUND

In the conventional Long Term Evolution (LTE) protocol architecture, the evolved Node B (eNB) protocol stack operates independently according to carriers, and each carrier is responsible for the related control and data processing of users under the carrier. As the demand continues to grow, the network architecture becomes increasingly complex. Inter-carrier coordination, including interference suppression, multi-carrier transmission, multi-point coordination, physical channel increase, and multi-format physical technology coordination etc., are gradually introduced into 5G networks. Higher requirements are put forward for intra-cell coordination and inter-cell coordination, each of which is synchronized with the real-time capability over Air Interface. These requirements all need the eNB to support more cells and to make optimization selection among a large number of cells, and the real-time capability of the cell is required to be synchronized with the real-time capability over Air Interface. In the existing embedded architecture, the number of 20 MHz cells supported by a Building Base band Unit (BBU) board is generally relatively small due to cost constraints, and is limited to the impossibility of implementation of coordination between BBU boards with high real-time capability. Thus, it is not possible to implement multi-cell coordination for a large number of cells, which is synchronized with the real-time capability over Air Interface, and it is not possible to meet coordination requirements from a 5G network.

SUMMARY

In order to solve the problem existing in the related art, the present disclosure provides a date processing method and a base station which can meet the coordination requirement from a 5G network.

In order to achieve the above object, the technical solutions of the embodiments of the present application are implemented as follows.

Embodiments of the present disclosure provide a base station, including: an identification unit and more than two task processing units; tasks which can be processed by the more than two task processing units are divided according to a pre-set task cycle gradient, so that the more than two task processing units can process tasks having cycles within different task cycle ranges, herein the identification unit is arranged to obtain a task, identify the cycle of the task, and send the task to a task processing unit corresponding to the cycle of the task for processing;

the task processing unit is arranged to obtain and process the task sent by the identification unit.

In an embodiment, the more than two task processing units may include: a Radio Resource Management (RRM) unit, a slow Media Access Control (MAC) unit, and a fast MAC unit, herein the RRM unit may be arranged to obtain and process tasks having cycles greater than or equal to a first threshold;

the slow MAC unit may be arranged to obtain and process tasks having cycles greater than a second threshold and smaller than the first threshold;

the fast MAC unit may be arranged to obtain and process tasks having cycles not greater than the second threshold;

herein the second threshold is smaller than the first threshold.

In an embodiment, the RRM unit may include at least two RRM sub-units, tasks which can be processed by the at least two RRM sub-units are divided according to a first pre-set task cycle gradient; specifically cycles within task cycle ranges included in the first pre-set task cycle gradient are greater than or equal to the first threshold;

herein the at least two RRM sub-units may be arranged to process tasks having cycles within respective task cycle ranges.

In an embodiment, the slow MAC unit may include at least two slow MAC sub-units, tasks which can be processed by the at least two slow MAC sub-units are divided according to a second pre-set task cycle gradient; herein cycles within the task cycle ranges included in the second pre-set task cycle gradient are greater than the second threshold and smaller than the first threshold;

herein the at least two slow MAC sub-units may be arranged to process tasks having cycles within respective task cycle ranges.

In an embodiment, the fast MAC unit may include at least two fast MAC sub-units; herein a first fast MAC sub-unit is any one of the at least two fast MAC sub-units;

the first fast MAC sub-unit may be arranged to process, in real time, a task interacting with a physical (PHY) channel.

Embodiments of the disclosure also provide a data processing method, including:

an identification unit of a base station obtains a task, identify the cycle of the task and distribute the task to a task processing unit corresponding to the cycle of the task for processing;

herein the base station may include more than two task processing units; tasks which can be processed by the more than two task processing units are divided according to a pre-set task cycle gradient, so that the more than two task processing units can process tasks having cycles within different task cycle ranges.

In an embodiment, the more than two task processing units may include: a Radio Resource Management (RRM) unit, a slow Media Access Control (MAC) unit, and a fast MAC unit;

the operation that the cycle of the task is identified and the task is distributed to a task processing unit corresponding to the cycle of the task for processing may include:

the cycle of the task is identified, and the task is distributed to the RRM unit for processing when the cycle of the task is greater than or equal to a first threshold;

the task is distributed to the slow MAC unit for processing when the cycle of the task is greater than a second threshold and smaller than the first threshold;

the task is distributed to the fast MAC unit for processing when the cycle of the task is not greater than the second threshold;

herein the second threshold is smaller than the first threshold.

In an embodiment, the RRM unit may include at least two RRM sub-units, tasks which can be processed by the at least two RRM sub-units are divided according to a first pre-set task cycle gradient, and wherein cycles within task cycle ranges included in the first pre-set task cycle gradient are greater than or equal to the first threshold;

the operation that the task is distributed to the RRM unit for processing includes: the task is distributed to a RRM sub-unit corresponding to the cycle of the task for processing.

In an embodiment, the slow MAC unit may include at least two slow MAC sub-units, tasks which can be processed by the at least two slow MAC sub-units are divided according to a second pre-set task cycle gradient, and wherein cycles within task cycle ranges included in the second pre-set task cycle gradient is greater than the second threshold and smaller than the first threshold;

herein the operation that the task is distributed to the slow MAC unit for processing includes: the task is distributed to a slow MAC sub-unit corresponding to the cycle of the task for processing.

In an embodiment, the fast MAC unit may include at least two fast MAC sub-units; herein a first fast MAC sub-unit is any one of the at least two fast MAC sub-units.

The operation that the task is distributed to the fast MAC unit for processing includes: the task is distributed to the first fast MAC sub-unit for processing when the task is interacting with a physical (PHY) channel.

The embodiments of the present disclosure provide a data processing method and a base station. The base station includes: an identification unit and more than two task processing units. Tasks which can be processed by the more than two task processing units are divided according to a pre-set task cycle gradient, so that the more than two task processing units can process tasks having cycles within different ranges. Specifically, the identification unit is arranged to obtain a task, identify the cycle of the task, and send the task to a task processing unit corresponding to the cycle of the task for processing. The task processing unit is arranged to obtain and process the task sent by the identification unit. As such, on the one hand, the solution of the embodiments of the present disclosure when it is compatible with the existing base station device (such as 4G) can meet the coordination requirement of the future network (such as 5G) with multiple levels and multiple types in such a manner that multiple stages (at least three stages) are coordinated. On the other hand, the solution of the embodiments of the present disclosure when it is compatible with the existing base station device (such as 4G) can process the task according to the advantage of each platform by providing the task processing unit on the base station in a distributive manner, therefore, the processing ability of each platform is played properly and a solution for the cloud computing of the air interface is provided.

DETAILED DESCRIPTION

Figure 1:
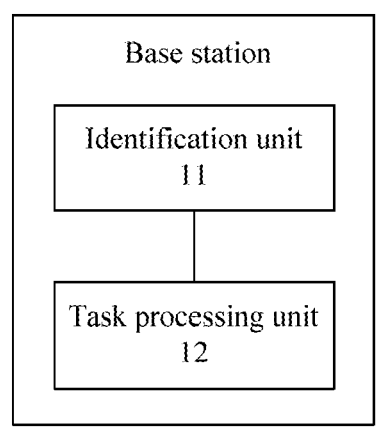
FIG. 1 is a schematic structural diagram of a base station according to an embodiment of the present disclosure.

The disclosure will be further described in detail with reference to the accompanying drawings and specific embodiments.

The conventional eNB protocol stack is in unit of carrier, i.e. each subsystem of the protocol stack uses a carrier as the basic processing unit, and each carrier is responsible for the related control and data processing of users under respective carriers. The conventional eNB protocol stack cannot achieve inter-carrier coordination with high real-time capability. Even if a slow control such as Inter Cell Interference Coordination (ICIC) is needed to be achieved, an independent device must be connected to the X2 interface for coordination. Each of the protocol sub-layers L1/L2/L3 processes the user's traffic in unit of carrier, and the carriers do not interact and coordinate with each other. This design architecture of the protocol stack is unable to adapt to the inter-carrier scheduling requirements. When the Coordinated Multiple Points (CoMP) transmission and the carrier aggregation (CA) of the LTE-Advanced (LTE-A) are performed, as the dynamic coordination with high real-time capability cannot be performed, the coordination can just be performed in a pre-planning manner, that is to say, the inter-cell coordination can be achieved by performing pre-planning using a network regulation software according to the networking condition.

In 5G communications, a large number of coordination techniques have been introduced, such as uplink and downlink full-duplex, high-density networking of heterogeneous network (HetNet), mixed physical layer technology and the like. Higher requirements are put forward for intra-cell coordination and inter-cell coordination, each of which is synchronized with the real-time capability over Air Interface. These requirements all need the eNB to support more cells and to make optimization selection among a large number of cells, and the real-time capability of the cell is required to be synchronized with the real-time capability over Air Interface. In the existing embedded architecture, the number of 20 MHz cells supported by a Building Base band Unit (BBU) board is generally relatively small due to cost constraints, and is limited to the impossibility of implementation of coordination between BBU boards with high real-time capability. Thus, it is not possible to implement multi-cell coordination for a large number of cells, which is synchronized with the real-time capability over Air Interface, and it is not possible to support the future coordination technology.

Thus, in order to adapt the inter carrier coordination in the future communication technology, including interference suppression, multi-carrier transmission, multi-point coordination, physical channel increase, and multi-format physical technology coordination, etc. it is necessary to break through the traditional embedded architecture and design a new architecture.

Based on this, in an embodiment of the present disclosure, a base station includes more than two task processing units which can process tasks having cycles within different cycle ranges. Specifically, tasks which can be processed by the more than two task processing units are divided according to a pre-set task cycle gradient. For example, cycles of tasks which can be processed by the first task processing unit are above a hundred milliseconds; cycles of tasks which can be processed by the second task processing unit are in a range from ten milliseconds to a hundred milliseconds; cycles of tasks which can be processed by the third task processing unit are below ten milliseconds, even five milliseconds. After a task is obtained by a base station, the cycle of the task is identified, and the task is processed by the task processing unit corresponding to the cycle of the task in the base station.

It should be noted that, the first, second, etc. used herein merely represent different task processing units, and the function of the task processing unit is not specifically limited.

First Embodiment

The embodiment of the present disclosure provides a base station. FIG. 1 is a schematic structural diagram of a base station according to an embodiment of the present disclosure. As shown in FIG. 1, the base station includes: an identification unit 11 and more than two task processing units 12. Tasks which can be processed by the more than two task processing units 12 are divided according to a pre-set cycle task gradient, so that the more than two task processing units can process tasks having cycles within different task cycle ranges.

Specifically, the identification unit 11 is arranged to obtain a task, identify the cycle of the task, and send the task to a task processing unit 12 corresponding to the cycle of the task for processing.

The task processing unit 12 is arranged to obtain and process the task sent by the identification unit 11.

In this embodiment, the task obtained by the identification unit 11 is the task data which is need to be coordinated, and the task data may be obtained from a core network (EPC) element, or may be obtained from a user-side device. Based on this, the identification unit 11 is not limited to one, and is also not limited to being located in a fixed physical entity.

In this embodiment, the tasks which can be processed by the more than two task processing units 12 are divided according to a pre-set task cycle gradient. That is to say, the tasks which can be processed by the more than two task processing units 12 are divided according to requirements on real-time capability. For example, cycles of tasks which can be processed by the first task processing unit 12 are above a hundred milliseconds; cycles of tasks which can be processed by the second task processing unit 12 are in the range from ten milliseconds to a hundred milliseconds; cycles of tasks which can be processed by the third task processing unit 12 are below ten milliseconds, or even below five milliseconds. In this embodiment, the coordination manner of the task processing unit 12 is further refined to at least three stages coordination from two stages coordination which is combined by known fast/slow RRM/MAC, so as to meet the application requirement of the 5G network scenario.

Figure 2:
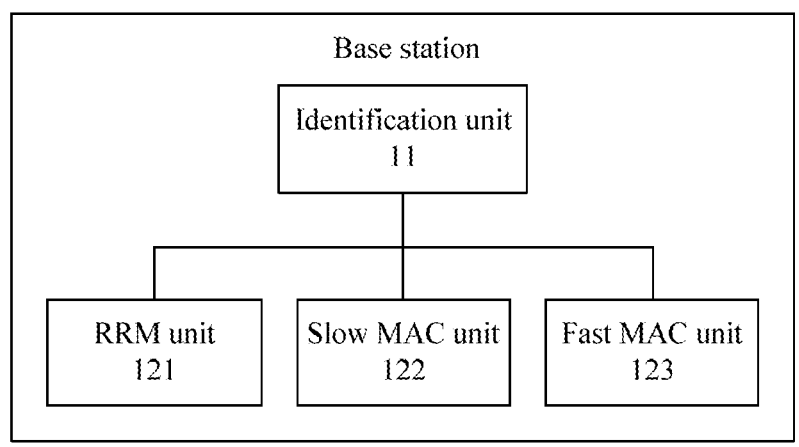
FIG. 2 is another schematic structural diagram of a base station according to an embodiment of the present disclosure.

As an embodiment, FIG. 2 is a second schematic structure diagram of a base station according to an embodiment of the present disclosure. As shown in FIG. 2, on the basis of the structure of the base station shown in FIG. 1, the more than two task processing units 12 include a RRM unit, a slow MAC unit and a fast MAC unit 123.

Specifically, the RRM unit 121 is arranged to obtain and process tasks having cycles greater than or equal to a first threshold.

The slow MAC unit 122 is arranged to obtain and process tasks having cycles greater than a second threshold and smaller than the first threshold.

The fast MAC unit 123 is arranged to obtain and process tasks having cycles not greater than the second threshold.

Specifically, the identification unit 11 in the base station divides tasks required to be coordinated in the Residential Access Network (RAN) according to requirements on real-time capability, into at least three categories. The at least three categories of tasks may be represented by TRRM, TMAC_Slow, and TMAC_Fast respectively. Specifically, TRRM represents the ultra-slow task, i.e., the coordination task having a longer cycle, such as the coordination task having a cycle not less than the order of several tens milliseconds. TMAC_Fast represents a coordination task synchronized with the real-time capability over Air Interface, i.e., a coordination task with the highest requirement on real-time capability, that is to say, the latency when the coordination tasks interacts data is minimum, such as the cycle of the coordination task is within one millisecond. TMAC_Slow represents a slow coordination task, i.e., a coordination task having a cycle shorter than the cycle represented by TRRM and longer than the cycle represented by the MAC_Fast, such as the coordination task having a cycle not higher than the order of ten milliseconds and not lower than the order of one millisecond.

Based on this, cycles of tasks which can be processed by the RRM unit 121 are pre-configured to be greater than or equal to the first threshold; cycles of tasks which can be processed by the slow MAC unit 122 are pre-configured to be greater than a second threshold and smaller than the first threshold; and cycles of tasks which can be processed by the fast MAC unit 123 are pre-configured to be smaller than or equal to the second threshold; the second threshold is smaller than the first threshold. Therefore, after identifying a cycle of a task, the identification unit 11 send the task to the task processing unit 12 (the RRM unit 121, the slow MAC unit 122 or the fast MAC unit 123) corresponding to the cycle of the task for processing, to utilize the advantage of each task processing unit 12 and meet the requirement on real-time capability of each coordination task.

In this embodiment, the first threshold is on the order of hundreds milliseconds, that is to say, the first threshold is greater than or equal to 100 milliseconds; the second threshold is on the order of milliseconds, that is to say, the second threshold is smaller than or equal to 10 milliseconds. For example, the first threshold is 100 milliseconds and the second threshold is 5 milliseconds. For example, if the first threshold is 100 milliseconds and the second threshold is 5 milliseconds, the RRM unit 121 may be used to process tasks having cycles greater than or equal to 100 milliseconds, such as, ICIC tasks having cycles on the order of greater than 100 milliseconds and smaller than hours, resource allocation tasks within a cell etc. The slow MAC unit 122 may be used to process tasks having cycles greater than 1 millisecond and smaller than 100 milliseconds, that is to say, for example, resource scheduling tasks having cycles on the order of 10 milliseconds, inter-user coordination tasks having cycles on the order of 5 milliseconds etc. The fast MAC unit 123 may be used to process tasks having cycles not greater than 1 millisecond, that is to say, the requirement on real-time capability of the coordination task processed by the fast MAC unit 123 is the highest and is almost completely synchronized with the real-time capability over Air Interface, and the latency of the date interaction is the smallest, such as resource allocation tasks having cycles within 1 millisecond, channel quality estimation tasks etc.

In practical applications, the above-described protocol stack architecture which is divided into three stages may be flexibly distributed on the platform of the base station device, for example, the RRM unit 121 may be provided on a large base station server, may be responsible for processing coordination tasks among wireless cells in a wide range, and may process tasks of which the requirements on real-time capability are not high through the cloud processing technology. For another example, the slow MAC unit 122 may be provided on a local fast platform, such as on a main control board of an eNB (different from BBU board), to coordinate tasks locally and quickly. For yet another example, the fast MAC unit 123 may be provided on a platform which is at the same stage as the physical (PHY) channel, to realize the synchronized coordination task processing of the two. In the multi-layer network architecture of the 5G, the RRM unit 121, the slow MAC unit 122 and the fast MAC unit 123 may be provided at different network levels to realize a more reasonable distributed configuration.

Figure 3:
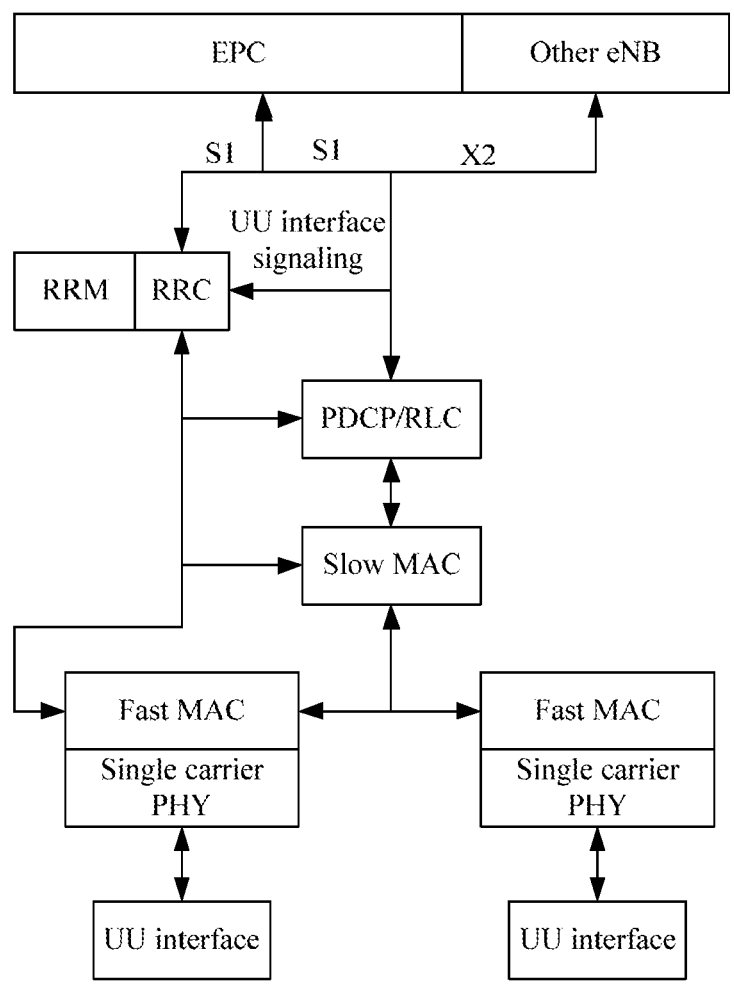
FIG. 3 is an schematic architecture diagram of a protocol stack of a base station according to an embodiment of the present disclosure.

FIG. 3 is a schematic architecture diagram of a protocol stack of a base station according to an embodiment of the present disclosure. Based on the above description about the function of each unit in the base station, the architecture of the protocol stack of the base station as shown in FIG. 3 may be obtained. As shown in FIG. 3, through the multi-stage coordination solution, different task processing units 12 can be used for processing according to the cycle of the task. Specifically, the coordination task of which the requirement on real-time capability is highest may be processed by the fast MAC unit 123. The fast MAC unit may be provided on the platform which is at the same stage as the physical (PHY) channel, to completely match the real-time capability of the PHY channel, and to ensure the latency of the data interaction between the fast MAC unit and the PHY channel minimum. The coordination task of which the requirement on real-time capability is the lowest may be processed by the RRM unit 121. The RRM unit 121 can be provided on the platform which is at the same stage as the Radio Resource Control (RRC) module, to realize the task such as the resource allocation within a cell through the data interaction with the RRC module. The coordination task of which the requirement on real-time capability is neither the highest nor the lowest may be processed by the slow MAC unit 122. The slow MAC unit 122 may be provided at the next layer of the Packet Data Convergence Protocol/Radio Link Control Layer protocol (PDCP/RLC) and at the upper layer of the fast MAC unit 123, in this way, it is possible to implement a coordination task in which the process is relatively complicated and of which the requirement on real-time capability is not high.

On the one hand, the solution of the embodiments of the present disclosure when it is compatible with the existing base station device (such as 4G) can meet the coordination requirement of the future network (such as 5G) with multiple levels and multiple types in such a manner that multiple stages (at least three stages) are coordinated. On the other hand, the solution of the embodiments of the present disclosure when it is compatible with the existing base station device (such as 4G) can process the task according to the advantage of each platform by providing the task processing unit on the base station in a distributive manner, therefore, the processing ability of each platform is played properly and a solution for the cloud computing of the air interface is provided.

Second Embodiment

Figure 4:
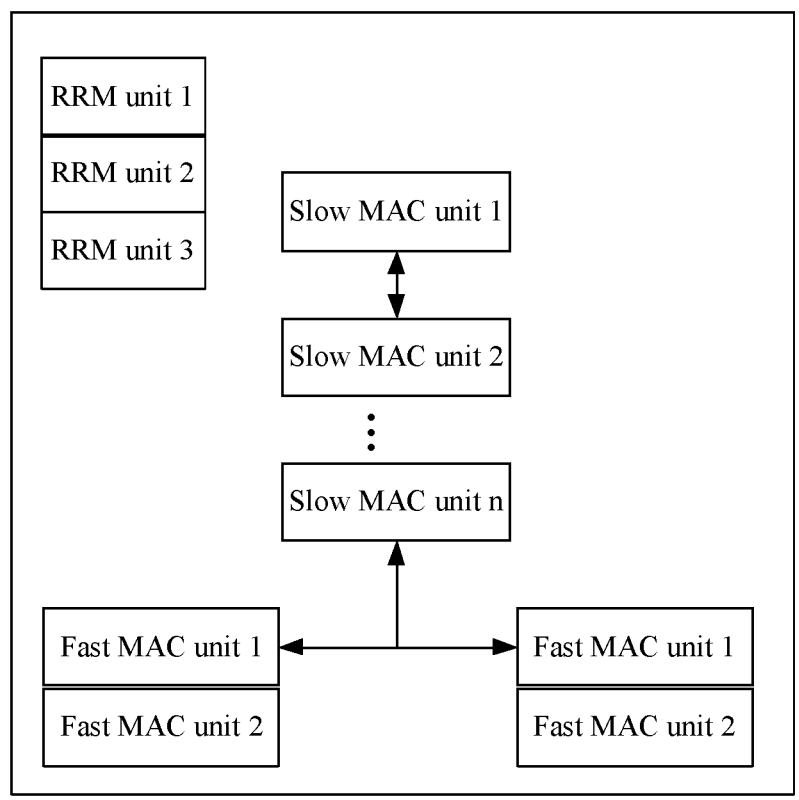
FIG. 4 is a schematic structural diagram of more than two task processing units in a base station according to an embodiment of the present disclosure.

Based on the first embodiment, an embodiment of the present disclosure provides a base station. FIG. 4 is a schematic structure diagram of more than two task processing units in the base station according to an embodiment of the disclosure. As shown in FIG. 4, the RRM unit includes at least two RRM sub-units, tasks processed by the at least two RRM sub-units are divided according to a first pre-set task cycle gradient. Specifically, cycles within task cycle ranges included in the first pre-set task cycle gradient are greater than or equal to the first threshold.

The at least two RRM sub-units may be arranged to process tasks having cycles within respective task cycle ranges.

The slow MAC unit includes at least two slow MAC sub-units, tasks processed by the at least two slow MAC sub-units are divided according to a second pre-set task cycle gradient. Specifically, cycles within the task cycle ranges included in the second pre-set task cycle gradient are greater than the second threshold and smaller than the first threshold.

The at least two slow MAC sub-units are arranged to process tasks having cycles within respective task cycle ranges.

The fast MAC unit includes at least two fast MAC sub-units. Specifically, a first fast MAC sub-unit may be any one of the at least two fast MAC sub-units.

The first fast MAC sub-unit may be arranged to process, in real time, a task interacting with a physical (PHY) channel.

Specifically, for the RRM unit, in this embodiment, the RRM unit is further divided into at least two RRM sub-units according to requirements on real-time capability. The division basis is the task cycle gradient. For example, if the RRM unit is arranged to obtain and process tasks having cycles greater than or equal to the first threshold (for example the first threshold is 100 milliseconds), in the cycle range greater than 100 milliseconds, the cycle range can be divided into multiple stages, such as hours stage (such as the cycle range more than one hour), minutes stage (such as the cycle range from 1 minute to 1 hour), seconds stage (such as the cycle range from 1 second to 1 minute), 100 milliseconds stage (such as the cycle range from 100 milliseconds to 1 second), etc. The above four divided stages form the task cycle gradient greater than 100 milliseconds. According to the above division method, the RRM unit can be divided into four RRM sub-units, each RRM sub-unit is arranged to process the task having cycles within respective task cycle ranges. For example, the first RRM sub-unit is arranged to process tasks having cycles greater than 1 hour, the second RRM sub-unit is arranged to process tasks having cycles from 1 minute to 1 hour, the third RRM sub-unit is arranged to process tasks having cycles from 1 second to 1 minute, and the fourth RRM sub-unit is arranged to process tasks having cycles from 100 milliseconds to 1 second. Of course, in the embodiments of the present disclosure, the division method of the at least two RRM sub-units is not limited to those described above, and may also be other division method based on the first pre-set task cycle gradient.

For the slow MAC unit, in this embodiment, the slow MAC unit is further divided into at least two slow MAC sub-units according to requirements on real-time capability. That is to say, in a practical application, the slow MAC unit is further divided into at least two slow MAC sub-units in a manner of performing progressively placement according to the number of the cells to be managed as required. Mainly for the coarse scheduling of the user/resource, the preprocessing of the channel and the like, the task processing functions with hierarchical requirements on real-time capability, such as functions for processing cell resources, user resources, user channels and user capabilities, are divided into different slow MAC sub-units. To smooth the real-time capability of the tasks as much as possible so that various platforms can make good use of their advantages on processing.

For the fast MAC unit, in this embodiment, the fast MAC unit may be divided into at least two fast MAC sub-units. For example, if the fast MAC unit includes two fast MAC sub-units, specifically, one of the fast MAC sub-units is arranged to process the task of a TTI which may specifically be a resource allocation task and/or a user scheduling task, the other one of the fast MAC sub-unit is arranged to process, in real time, the task interacting with the PHY channel, that is to say, the requirement on real-time capability of the processed task is the highest, completely matches the real-time capability of the PHY channel and ensures the latency of the data interaction between the fast MAC sub-unit and the PHY channel minimum. Of course, in the embodiment of the present disclosure, the task interacting with the PHY channel is not limited to be processed by one fast MAC sub-unit. Accordingly, in the embodiment of the present disclosure, the task of one TTI is not limited to be processed by one fast MAC sub-unit.

On the one hand, the solution of the embodiments of the present disclosure when it is compatible with the existing base station device (such as 4G) can meet the coordination requirement of the future network (such as 5G) with multiple levels and multiple types in such a manner that multiple stages (at least three stages) are coordinated. On the other hand, the solution of the embodiments of the present disclosure when it is compatible with the existing base station device (such as 4G) can process the task according to the advantage of each platform by providing the task processing unit on the base station in a distributive manner, therefore, the processing ability of each platform is played properly and a solution for the cloud computing of the air interface is provided.

Third Embodiment

Figure 5:
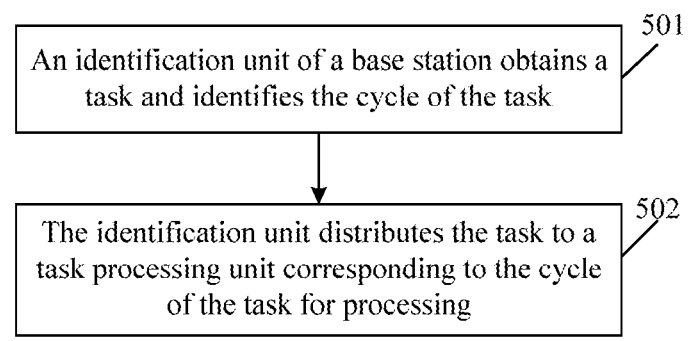
FIG. 5 is a schematic flowchart of a data transmission method according to an embodiment of the present disclosure.

Based on the above-described base station, the embodiment of the present disclosure also provides a data transmission method. The data transmission method is applied to a base station. The base station includes more than two task processing units, tasks which can be processed by the more than two task processing units are divided according to a pre-set task cycle gradient, so that the more than two task processing units can process tasks having cycles within different ranges. FIG. 5 is a schematic flowchart of a data transmission method according to an embodiment of the present disclosure. As shown in FIG. 5, the data transmission method includes:

at operation 501, an identification unit of a base station obtains a task and identifies the cycle of the task.

at operation 502, the identification unit of the base station distributes the task to the task processing unit corresponding to the cycle of the task for processing.

In this embodiment, the task obtained by the base station is the task data which is need to be coordinated. The task data may be obtained from a core network (EPC) element, or may be obtained from a user-side device.

In this embodiment, tasks which can be processed by the more than two task processing units are divided according to a pre-set task cycle gradient. That is to say, the tasks which can be processed by the more than two task processing units are divided according to requirements on real-time capability. For example, cycles of tasks which can be processed by the first task processing unit are above a hundred milliseconds; cycles of tasks which can be processed by the second task processing unit are in a range from ten milliseconds to a hundred milliseconds; cycles of tasks which can be processed by the third task processing unit are below ten milliseconds, even five milliseconds. In this embodiment, the coordination manner of the task processing unit is further refined to at least three stages coordination from the two stages coordination which is combined by known fast/slow RRM/MAC, so as to meet the application requirement of the 5G network scenario.

As an embodiment, specifically, as shown in FIG. 2, the more than two task processing units include: a RRM unit, a slow MAC unit and a fast MAC unit. In this embodiment, the operation that the cycle of the task is identified and the task is distributed to the task processing unit corresponding to the cycle of the task for processing includes: the identification unit identifies the cycle of the task and distributes the task to the RRM unit for processing when the cycle of the task is greater than or equal to a first threshold. The identification unit distributes the task to the slow MAC unit for processing when the cycle of the task is greater than a second threshold and smaller than the first threshold. The identification unit distributes the task to the fast MAC unit for processing when the cycle of the task is not greater than the second threshold. Specifically, the second threshold is smaller than the first threshold.

Specifically, the base station divides tasks required to be coordinated in the Residential Access Network (RAN) according to requirements on real-time capability, into at least three categories. The at least three categories of tasks may be represented by TRRM, TMAC_Slow, and TMAC_Fast respectively. Specifically, TRRM represents the ultra-slow task, i.e., the coordination task having a longer cycle, such as the coordination task having a cycle not less than the order of several tens milliseconds. TMAC_Fast represents a coordination task synchronized with the real-time capability over Air Interface, i.e., a coordination task with the highest requirement on real-time capability, that is to say, the latency when the coordination tasks interacts data is minimum, such as the cycle of the coordination task is within one millisecond. TMAC_Slow represents a slow coordination, i.e., a coordination task having a cycle shorter than the cycle represented by TRRM and longer than the cycle represented by the MAC_Fast, such as the coordination task having a cycle not higher than the order of ten milliseconds and not lower than the order of one millisecond.

Based on this, cycles of tasks which can be processed by the RRM unit are pre-configured to be greater than or equal to the first threshold; cycles of tasks which can be processed by the slow MAC unit are pre-configured to be greater than a second threshold and smaller than the first threshold; and cycles of tasks which can be processed by the fast MAC unit are pre-configured to be smaller than or equal to the second threshold; the second threshold is smaller than the first threshold. Therefore, after identifying a cycle of a task, the identification unit send the task to the task processing unit (the RRM unit, the slow MAC unit or the fast MAC unit) corresponding to the cycle of the task for processing, to utilize the advantage of each task processing unit and meet the requirement on real-time capability of each coordination task.

In this embodiment, the first threshold is on the order of hundreds milliseconds, that is to say, the first threshold is greater than or equal to 100 milliseconds; the second threshold is on the order of milliseconds, that is to say, the second threshold is smaller than or equal to 10 milliseconds. For example, the first threshold is 100 milliseconds and the second threshold is 5 milliseconds. For example, if the first threshold is 100 milliseconds and the second threshold is 5 milliseconds, the RRM unit may be used to process tasks having cycles greater than or equal to 100 milliseconds, such as, ICIC tasks having cycles on the order of greater than 100 milliseconds and smaller than hours, resource allocation tasks within a cell etc. The slow MAC unit may be used to process tasks having cycles greater than 1 millisecond and smaller than 100 milliseconds, that is to say, for example, resource scheduling tasks having cycles on the order of 10 milliseconds, inter-user coordination tasks having cycles on the order of 5 milliseconds etc. The fast MAC unit may be used to process tasks having cycles not greater than 1 millisecond, that is to say, the requirement on real-time capability of the coordination task processed by the fast MAC unit is the highest and almost completely synchronizes with the real-time requirement of the air interface, and the latency of the date interaction is the smallest, such as resource allocation tasks having cycles within 1 millisecond, channel quality estimation tasks etc.

In practical applications, the above-described protocol stack architecture which is divided into three stages may be flexibly distributed on the platform of the base station device, for example, the RRM unit may be provided on a large base station server, may be responsible for processing coordination tasks among wireless cells in a wide range, and may process tasks of which requirements real-time capability are not high through the cloud processing technology. For another example, the slow MAC unit may be provided on a local fast platform, such as on a main control board of an eNB (different from BBU board), to coordinate tasks locally and quickly. For yet another example, the fast MAC unit may be provided on a platform which is at the same stage as the physical (PHY) channel, to realize the synchronized coordination task processing of the two. In the multi-layers network architecture of the 5G, the RRM unit, the slow MAC unit and the fast MAC unit may be provided at different network levels to realize a more reasonable distributed configuration.

Based on this, specifically, as an embodiment, the RRM unit includes at least two RRM sub-units, tasks processed by the at least two RRM sub-units are divided according to a first pre-set task cycle gradient. Specifically, cycles within the task cycle ranges included in the first pre-set task cycle gradient are greater than or equal to the first threshold. The operation that the task is distributed to the RRM unit for processing includes the task is distributed to a RRM sub-unit corresponding to the cycle of the task for processing.

Specifically, for the RRM unit, in this embodiment, the RRM unit is further divided into at least two RRM sub-units according to requirements on real-time capability. The division basis is the task cycle gradient. For example, if the RRM unit is arranged to obtain and process tasks having cycles are greater than or equal to the first threshold (for example the first threshold is 100 milliseconds), in the cycle range greater than 100 milliseconds, the cycle range can be divided into multiple stages, such as hours stage (such as the cycle range more than one hour), minutes stage (such as the cycle range from 1 minute to 1 hour), seconds stage (such as the cycle range from 1 second to 1 minute), 100 milliseconds stage (such as the cycle range from 100 milliseconds to 1 second), etc. The above four divided stages form the task cycle gradient greater than 100 milliseconds. According to the above division method, the RRM unit can be divided into four RRM sub-units, each RRM sub-unit is arranged to process the task having cycles within respective task cycle ranges. For example, the first RRM sub-unit is arranged to process tasks having cycles greater than 1 hour, the second RRM sub-unit is arranged to process tasks having cycles from 1 minute to 1 hour, the third RRM sub-unit is arranged to process tasks having cycles from 1 second to 1 minute, and the fourth RRM sub-unit is arranged to process tasks having cycles from 100 milliseconds to 1 second. Of course, in the embodiments of the present disclosure, the division method of the at least two RRM sub-units is not limited to those described above, and may also be other division method based on the first pre-set task cycle gradient.

As an embodiment, the slow MAC unit includes at least two slow MAC sub-units, tasks which can be processed by the at least two slow MAC sub-units are divided according to a second pre-set task cycle gradient. Specifically, cycles within the task cycle ranges included in the second pre-set task cycle gradient is greater than the second threshold and smaller than the first threshold. Therefore, the operation that the task is distributed to the slow MAC unit for processing includes: the task is distributed to the slow MAC sub-unit corresponding to the cycle of the task for processing.

For the slow MAC unit, in this embodiment, the slow MAC unit is further divided into at least two slow MAC sub-units according to requirements on real-time capability. That is to say, in a practical application, the slow MAC unit is further divided into at least two slow MAC sub-units in a manner of performing progressively placement according to the number of the cells to be managed as required. Mainly for the coarse scheduling of the user/resource, the pre-processing of the channel and the like, the task processing functions with hierarchical requirements on real-time capability, such as functions for processing cell resources, user resources, user channels, and user capabilities, are divided into different slow MAC sub-units. To smooth the real-time capability of the tasks as much as possible so that various platforms can make good use of their advantages on processing.

As an embodiment, the fast MAC unit includes at least two fast MAC units. Specifically, the first fast MAC sub-unit may be any one of the at least two fast MAC units. The operation that the task is distributed to the fast MAC unit for processing includes: the task is distributed to the first fast MAC sub-unit for processing when the task is interacting with a physical (PHY) channel.

For the fast MAC unit, in this embodiment, the fast MAC unit may be divided into at least two fast MAC sub-units. For example, if the fast MAC unit includes two fast MAC sub-units, specifically, one of the fast MAC sub-units is arranged to process the task of a TTI which may specifically be a resource allocation task and/or a user scheduling task, the other one of the fast MAC sub-unit is arranged to process, in real time, the task interacting with the PHY channel, that is to say, the requirement on real-time capability of the processed task is the highest, completely matches the real-time capability of the PHY channel and ensures the latency of the data interaction between the fast MAC sub-unit and the PHY channel minimum. Of course, in the embodiment of the present disclosure, the task interacting with the PHY channel is not limited to be processed by one fast MAC sub-unit. Accordingly, in the embodiment of the present disclosure, the task of one TTI is not limited to be processed by one fast MAC sub-unit.

Based on the foregoing embodiments of the present disclosure, a detailed description will be made in conjunction with a specific application scenario.

In an Ultra-Dense Network (UDN), the number of users is large. To improve the quality of service for users at the edge of cells, a CoMP technology is used. The user using the CoMP technology may select which cells are used for serving. This process is more complex and the latency requirement is lower, therefore, this process can be processed by the slow MAC unit. However, other services of users having relatively high requirements on the real-time capability over Air Interface can be processed by the fast MAC unit. In this way, the MAC unit with a corresponding speed (the fast MAC unit or the slow MAC unit) can be scheduled for different service requests according to the specific requirement of the services (requirement on real-time capability).

On the one hand, the solution of the embodiments of the present disclosure when it is compatible with the existing base station device (such as 4G) can meet the coordination requirement of the future network (such as 5G) with multiple levels and multiple types in such a manner that multiple stages (at least three stages) are coordinated. On the other hand, the solution of the embodiments of the present disclosure when it is compatible with the existing base station device (such as 4G) can process the task according to the advantage of each platform by providing the task processing unit on the base station in a distributive manner, therefore, the processing ability of each platform is played properly and a solution for the cloud computing of the air interface is provided.

In the embodiments provided in this application, it should be understood that the disclosed devices and methods can be implemented in other ways. The device embodiments described above are only examples, for example, the division of the units is only a logical function division, and there are other division manners in practice. For example, multiple units or components may be combined, or may be integrated into another system, or some features can be ignored or not be performed. In addition, the coupling, direct coupling, or communication connection between the illustrated or discussed components may be indirect coupling or communication connection through some interfaces, devices or units, or may be in a form of electrical, mechanical, or others.

The units described as separate parts may be or may not be physically separated, and the parts illustrated as units may be or may not be physical units, that is, the parts may be located in one place, or may be distributed on multiple network units. Some or all of the units may be selected according to actual needs to achieve the purpose of the embodiments of the present disclosure.

In addition, functional units in the embodiments of the present disclosure may all be integrated in one processing unit, or each unit may be separately used as a unit, or two or more units may be integrated in one unit. The forgoing integrated unit can be implemented either in hardware or in hardware plus software functional units.

The ordinary technician in the related art can understand that all or parts of the operations for implementing the above method embodiments can be accomplished by the hardware related to program instructions. The foregoing program can be stored in a computer-readable storage medium, and the program when executed executes the operations including the above method embodiments. The foregoing storage medium may include media that can store program code, such as a mobile storage device, a read-only memory (ROM), a random access memory (RAM), a magnetic disk, an optical disk, etc.

Alternatively, the above-described integrated unit of the present disclosure may also be stored in a computer-readable storage medium if it is implemented as a software function module and sold or used as a stand-alone product. Based on such understanding, the technical solutions of the embodiments of the present disclosure may essentially embodied in the form of a software product, or parts of the technical solutions of the embodiments of the present disclosure which contribute to the prior art may be embodied in the form of a software product. The software product is stored in a storage medium and includes instructions for enabling a computer device (which may be a personal computer, a server, or a network device, etc.) to execute all or part of the methods described in the various embodiments of the present disclosure. The foregoing storage medium may include various media that can store program code, such as a mobile storage device, a ROM, a RAM, a magnetic disk, an optical disk, etc.

The foregoing descriptions are merely specific embodiment of the present disclosure, but the scope claimed by the present disclosure is not limited thereto, and any change or replacement which can be easily conceived by any person skilled in the art according to the present disclosure is within the scope claimed by the present disclosure. Therefore, the scope claimed by the present disclosure should be based on the scope of the claims.

The invention claimed is:

1. A base station, comprising: a processor; and one or more units stored on a memory and executable by the processor, the one or more units comprising an identification unit and more than two task processing units, tasks which are processed by the more than two task processing units being divided according to a pre-set task cycle gradient so that the more than two task processing units process tasks having cycles within different task cycle ranges, wherein the identification unit is arranged to obtain a task, identify the cycle of the task, and send the task to a task processing unit corresponding to the cycle of the task for processing; and the task processing unit is arranged to obtain and process the task sent by the identification unit.

2. The base station according to claim 1, wherein the more than two task processing units comprise: a Radio Resource Management (RRM) unit, a slow Media Access Control (MAC) unit, and a fast MAC unit,
wherein the RRM unit is arranged to obtain and process tasks having cycles greater than or equal to a first threshold;
the slow MAC unit is arranged to obtain and process tasks having cycles between a second threshold and the first threshold; and
the fast MAC unit is arranged to obtain and process tasks having cycles not greater than the second threshold,
wherein the second threshold is smaller than the first threshold.

3. The base station according to claim 2, wherein the RRM unit comprises at least two RRM sub-units, tasks which are processed by the at least two RRM sub-units are divided according to a first pre-set task cycle gradient, and wherein cycles within task cycle ranges included in the first pre-set task cycle gradient are greater than or equal to the first threshold; wherein the at least two RRM sub-units are arranged to process tasks having cycles within respective task cycle ranges.

4. The base station according to claim 2, wherein the slow MAC unit comprises at least two slow MAC sub-units, tasks which are processed by the at least two slow MAC sub-units are divided according to a second pre-set task cycle gradient; and wherein cycles within the task cycle ranges included in the second pre-set task cycle gradient are greater than the second threshold and smaller than the first threshold; wherein the at least two slow MAC sub-units are arranged to process tasks having cycles within respective task cycle ranges.

5. The base station according to claim 2, wherein the fast MAC unit comprises at least two fast MAC sub-units, wherein a first fast MAC sub-unit is any one of the at least two fast MAC sub-units;
the first fast MAC sub-unit is arranged to process, in real time, a task interacting with a physical (PHY) channel.

6. A data processing method, comprising: obtaining, by an identification unit of a base station, a task, identifying the cycle of the task and distributing the task to a task processing unit corresponding to the cycle of the task for processing; wherein the base station comprises more than two task processing units, tasks which are processed by the more than two task processing units are divided according to a pre-set task cycle gradient, so that the more than two task processing units process tasks having cycles within different task cycle ranges.

7. The method according to claim 6, wherein the more than two task processing units comprise: a Radio Resource Management (RRM) unit, a slow Media Access Control (MAC) unit, and a fast MAC unit;
wherein identifying the cycle of the task and distributing the task to the task processing unit corresponding to the cycle of the task for processing comprises:
identifying the cycle of the task, and distributing the task to the RRM unit for processing when the cycle of the task is greater than or equal to a first threshold;
distributing the task to the slow MAC unit for processing when the cycle of the task is greater than a second threshold and smaller than the first threshold;
distributing the task to the fast MAC unit for processing when the cycle of the task is not greater than the second threshold,
wherein the second threshold is smaller than the first threshold.

8. The method according to claim 7, wherein the RRM unit comprises at least two RRM sub-units, tasks which are processed by the at least two RRM sub-units are divided according to a first pre-set task cycle gradient, and wherein cycles within task cycle ranges included in the first pre-set task cycle gradient are greater than or equal to the first threshold; distributing the task to the RRM unit for processing comprises: distributing the task to a RRM sub-unit corresponding to the cycle of the task for processing.

9. The method according to claim 7, wherein the slow MAC unit comprises at least two slow MAC sub-units, tasks which are processed by the at least two slow MAC sub-units are divided according to a second pre-set task cycle gradient, and wherein cycles within task cycle ranges included in the second pre-set task cycle gradient is greater than the second threshold and smaller than the first threshold; wherein distributing the task to the slow MAC unit for processing comprises: distributing the task to a slow MAC sub-unit corresponding to the cycle of the task for processing.

10. The method according to claim 7, wherein the fast MAC unit comprises at least two fast MAC sub-units, wherein a first fast MAC sub-unit is any one of the at least two fast MAC sub-units;
wherein distributing the task to the fast MAC unit for processing comprises: distributing the task to the first fast MAC sub-unit for processing when the task is a task interacting with a physical (PHY) channel.

* * * * *